(12) United States Patent
Nishioka et al.

(10) Patent No.: US 9,069,184 B2
(45) Date of Patent: Jun. 30, 2015

(54) DISPLAY DEVICE, AND PORTABLE APPARATUS HAVING PROJECTOR FUNCTION

(75) Inventors: Ken Nishioka, Osaka (JP); Kenji Nagashima, Osaka (JP); Atsuya Hirano, Osaka (JP); Atsuhiko Chikaoka, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 465 days.

(21) Appl. No.: 13/635,554

(22) PCT Filed: Mar. 7, 2011

(86) PCT No.: PCT/JP2011/055242
§ 371 (c)(1),
(2), (4) Date: Sep. 17, 2012

(87) PCT Pub. No.: WO2011/114928
PCT Pub. Date: Sep. 22, 2011

(65) Prior Publication Data
US 2013/0010211 A1    Jan. 10, 2013

(30) Foreign Application Priority Data
Mar. 19, 2010 (JP) .................................. 2010-065178

(51) Int. Cl.
*G03B 21/28* (2006.01)
*H04N 9/31* (2006.01)
*G02B 27/48* (2006.01)
*G02B 26/10* (2006.01)
(Continued)

(52) U.S. Cl.
CPC ............... *G02B 27/48* (2013.01); *G02B 26/10* (2013.01); *G09G 3/02* (2013.01); *G09G 2320/0233* (2013.01); *G09G 3/002* (2013.01)

(58) Field of Classification Search
USPC ................... 353/30, 31, 121, 85, 46, 49, 51; 359/198.1, 213.1
See application file for complete search history.

(56) References Cited

U.S. PATENT DOCUMENTS

| 6,621,615 B2 | 9/2003 | Kruschwitz et al. |
| 7,059,523 B1 * | 6/2006 | Yavid .............................. 235/454 |

(Continued)

FOREIGN PATENT DOCUMENTS

| JP | 2001-102681 A | 4/2001 |
| JP | 2001-189520 A | 7/2001 |

(Continued)

OTHER PUBLICATIONS

International Search Report and Written Opinion, regarding PCT/JP2011/055242 international filing date of Mar. 7, 2011, mailed on Apr. 5, 2011.

(Continued)

*Primary Examiner* — William C Dowling
(74) *Attorney, Agent, or Firm* — Baker & Hostetler LLP (57) ABSTRACT

Disclosed is a display device capable of inhibiting a projected picture from occurrence of brightness unevenness while reducing speckle noise. The display device (100) includes a control portion (15) continuously supplying current to a laser beam generation portion (12, 13, 14) nonstop for a period longer than a first period thereby controlling the laser beam generation portion to output the laser beam and controlling the laser beam generation portion to stop the output of the laser beam at least once in a second period scanning one image forming element (1, 2).

20 Claims, 7 Drawing Sheets

(51) Int. Cl.
*G09G 3/02* (2006.01)
*G09G 3/00* (2006.01)

(56) References Cited

U.S. PATENT DOCUMENTS

| | | | |
|---|---|---|---|
| 7,835,409 | B2 | 11/2010 | Mizuuchi et al. |
| 8,419,195 | B2 * | 4/2013 | Nishigaki et al. ............... 353/99 |
| 2006/0139236 | A1 * | 6/2006 | Minatogawa .................... 345/32 |
| 2009/0122275 | A1 * | 5/2009 | Nagashima et al. ............ 353/85 |
| 2009/0224136 | A1 * | 9/2009 | Ikegami ........................ 250/205 |
| 2010/0006741 | A1 * | 1/2010 | Nishioka et al. ........... 250/201.1 |
| 2013/0222774 | A1 * | 8/2013 | Chikaoka ........................ 353/85 |

FOREIGN PATENT DOCUMENTS

| | | |
|---|---|---|
| JP | 2001-264660 A | 9/2001 |
| JP | 2002-296677 A | 10/2002 |
| JP | 2003-043975 A | 2/2003 |
| JP | 2003-098490 B2 | 4/2003 |
| JP | 2006-178342 A | 7/2006 |
| JP | 2008-539464 A | 11/2008 |
| JP | 2009-122365 A | 6/2009 |
| JP | 2010-020087 A | 1/2010 |
| JP | 2010-054879 A | 3/2010 |
| WO | 2007/099847 A1 | 7/2009 |

OTHER PUBLICATIONS

Extended European search report, from European application No. 11756117.5, mailed on Jul. 2, 2013 from the European Patent Office, Rijswijk, The Netherlands.

* cited by examiner

DISPLAY DEVICE, AND PORTABLE APPARATUS HAVING PROJECTOR FUNCTION

CROSS-REFERENCE TO RELATED APPLICATIONS

The present application is a national stage entry of PCT/JP2011/055242, filed Mar. 7, 2011, which claims the benefit of Japanese Application Serial No. 2010-065178, filed Mar. 19, 2010.

TECHNICAL FIELD

The present invention relates to a display device and a portable apparatus having a projector function, and more particularly, it relates to a display device including a laser beam generation portion outputting a laser beam and a portable apparatus having a projector function.

BACKGROUND TECHNIQUE

A display device including a laser beam generation portion outputting a laser beam is known in general. Such a display device is disclosed in Japanese Patent Laying-Open No. 2001-189520, for example.

In Japanese Patent Laying-Open No. 2001-189520, there is disclosed a projection type display device including a plurality of light-emitting laser diodes (laser beam generation portions) driven by receiving modulated current, an optical scanning portion projecting a picture by scanning laser beams and a modulation control portion supplying the modulated current to the light-emitting laser diodes. This projection, type display device according to Patent Document 1 oscillates laser beams having relaxation oscillation by supplying the modulated current to the laser diodes for a period shorter than a period when relaxation oscillation occurs at the initial lasing stage, and projects a picture by employing the laser beams having the relaxation oscillation (whose outputs are unstable). Thus, the projection type display device inhibits the picture from being projected in a state where a plurality of laser beams interfere with each other by projecting the picture with the laser beams whose outputs are unstable. The projection type display device thereby suppresses occurrence of speckle noise (white dotlike unevenness appearing in the projected picture) resulting from interference between the laser beams.

PRIOR ART

Patent Document

Patent Document 1: Japanese Patent Laying-Open No. 2001-189520

SUMMARY OF THE INVENTION

Problem to be Solved by the Invention

However, while the projection type display device described in Japanese Patent Laying-Open No. 2001-189520 is capable of reducing speckle noise in the projected picture by projecting the picture with the laser beams of relaxation oscillation states, there is such a problem that laser outputs are unstable in the laser beams of the relaxation oscillations states and hence brightness unevenness is caused in the projected picture.

The present invention has been proposed in order to solve the aforementioned problem, and an object of the present invention is to provide a display device capable of inhibiting a projected picture from occurrence of brightness unevenness while reducing speckle noise and a portable apparatus having a projector function.

Means for Solving the Problem and Effects of the Invention

A display device according to a first aspect of the present invention includes a laser beam generation portion supplied with current thereby outputting a laser beam, a projection portion projecting an image formed by a plurality of image forming elements on an arbitrary projection area by scanning the laser beam, and a control portion continuously supplying current to the laser beam generation portion nonstop for a period longer than a first period when such relaxation oscillation occurs that the output of the laser beam becomes unstable at the initial lasing stage thereby controlling the laser beam generation portion to output the laser beam and controlling the supply of the current to the laser beam generation portion to stop the output of the laser beam at least once in a second period scanning one image forming element.

In this display device according to the first aspect, as hereinabove described, a laser beam of a stable output can be generated in a period after the first period when the relaxation oscillation occurs by continuously supplying the current to the laser beam generation portion nonstop for the period longer than the first period when such relaxation oscillation occurs that the output of the laser beam becomes unstable at the initial lasing stage thereby controlling the laser beam generation portion to output the laser beam, whereby an average light output can be stabilized, and a picture can be displayed in a state where brightness is stable as a result, dissimilarly to a case of outputting the laser beam only in a period of not more than the first period when the relaxation oscillation occurs. Thus, the displayed picture can be inhibited from occurrence of brightness unevenness. Further, the output of the laser beam is stopped at least once in the second period scanning one image forming element so that the output of the laser beam is stopped in the second period scanning one image forming element, whereby a period when light interferes can be inhibited from lengthening also in a case where laser beams overlap with each other to cause interference of light. Thus, occurrence of speckle noise can be suppressed as compared with a case of not stopping the output of the laser beam in the second period scanning one image forming element. Thus, the picture can be inhibited from occurrence of brightness unevenness while reducing speckle noise in the laser beam.

Preferably in the aforementioned display device according to the first aspect, the control portion is formed to control the laser beam generation portion to stop the output of the laser beam when scanning an area including a boundary portion between adjacent image forming elements. When forming the display device in this manner, the laser beam can be inhibited from being continuously output on the boundary portion between the adjacent image forming elements, whereby the image forming element immediately at the back of the boundary portion can be projected with desired brightness without being influenced by the brightness of the image forming element immediately in front of the boundary portion. Thus, color unevenness can be inhibited from occurring on the boundary portion between the adjacent image forming elements due to the laser beam continuously output on the boundary portion between the adjacent image forming elements.

Preferably in this case, the control portion is formed to control the laser beam generation portion to repeat the output of the laser beam and stoppage of the output and to control the laser beam generation portion not to output the laser beam in a range including the boundary portion between the adjacent image forming elements by adjusting the second period scanning the image forming elements so that a stop period for the output of the laser beam and a terminal portion of the second period scanning one image forming element overlap with each other. When forming the display device in this manner, the output of the laser beam can be reliably stopped on a portion corresponding to the boundary portion between the adjacent image forming elements also in a case where the output of the laser beam and the stoppage of the output are repeatedly performed.

Preferably in the aforementioned display device repeating the output of the laser beam and the stoppage of the output, the control portion is formed to control the laser beam generation portion so that a period excluding the first period when the relaxation oscillation occurs within a period when the laser beam is output from the laser beam generation portion is longer than a period when the laser beam is not output. When forming the display device in this manner, sufficient brightness for the image forming elements can be ensured, dissimilarly to a case where the period when the laser beam is not output is longer than the period excluding the first period when the relaxation oscillation occurs within the period when the laser beam is output from the laser beam generation portion.

Preferably in the aforementioned display device repeating the output of the laser beam and the stoppage of the output, the control portion is formed to repeat control of supplying current of a magnitude of at least lasing threshold current to the laser beam generation portion thereby controlling the laser beam generation portion to output the laser beam and control of lowering the current to a magnitude of less than the lasing threshold current thereby controlling the laser beam generation portion not to output the laser beam. When forming the display device in this manner, the output of the laser beam and the stoppage of the output can be performed in a state regularly supplying current to the laser beam generation portion.

Preferably, the aforementioned display device repeating the output of the laser beam and the stoppage of the output further includes a picture processing portion transmitting a video signal corresponding to one image forming element to the control portion at a prescribed time interval, and the control portion is formed to control the laser beam generation portion to repeat the output of the laser beam and the stoppage of the output every cycle of the video signal transmitted by the picture processing portion. When forming the display device in this manner, the output of the laser beam and the stoppage of the output can be easily performed by employing the video signal transmitted by the picture processing portion.

Preferably in the aforementioned display device performing the control of repeating the output of the laser beam and the stoppage of the output, the control portion is formed to control the laser beam generation portion not to output the laser beam so that the vicinity of a rear end portion, the vicinity of a central portion or the vicinity of a front end portion of a stop period for the output of the laser beam and the vicinity of the boundary portion between adjacent image forming elements coincide with each other. When forming the display device in this manner, the output of the laser beam can be reliably stopped in the vicinity of the boundary portion between the adjacent image forming elements also in the case where the output of the laser beam and the stoppage of the output are repeatedly performed.

Preferably in the aforementioned display device according to the first aspect, the projecting portion is formed to project the image formed by the plurality of image forming elements while changing the speed for scanning the laser beam, and the control portion is formed to control the laser beam generation portion to repeat the output of the laser beam and the stoppage of the output by a first frequency consisting of a plurality of times in the image forming elements corresponding to an area where the speed for scanning the laser beam is low and to control the laser beam generation portion to perform the output of the laser beam and the stoppage of the output by a second frequency smaller than the first frequency in the image forming elements corresponding to an area where the speed for scanning the laser beam is high. When forming the display device in this manner, speckle noise can be reduced while ensuring sufficient brightness for the image forming elements and the picture can be inhibited from occurrence of brightness unevenness by repeating the output of the laser beam and the stoppage of the output by the first frequency consisting of the plurality of times in a case of projecting the area where the speed for scanning the laser beam is low. Also in a case of projecting the area where the speed for scanning the laser beam is high, the magnitude of the image forming elements projected by performing the output of the laser beam and the stoppage of the output by the first frequency in the area where the speed for scanning the laser beam is high can be rendered substantially identical to the magnitude of the image forming elements projected by repeating the output of the laser beam and the stoppage of the output by the second frequency in the area where the speed for scanning the laser beam is low by performing the output of the laser beam and the stoppage of the output by the second frequency smaller than the first frequency, whereby speckle noise can be reduced and the picture can be inhibited from occurrence of brightness unevenness while projecting the image forming elements substantially identical in magnitude to the image forming elements in the area where the speed for scanning the laser beam is low. Thus, speckle noise can be reliably reduced and the picture can be inhibited from occurrence of brightness unevenness while projecting the image forming elements so that the magnitudes of the respective image forming elements are substantially identical to each other also in a case where the speed for scanning the laser beam changes.

Preferably in this case, the projection portion is formed to project the image formed by the plurality of image forming elements in the horizontal direction, the display device is so formed that the speed of the projecting portion for scanning the laser beam is minimized in the vicinity of both end portions in the horizontal direction of the image formed by the plurality of image forming elements and maximized in the vicinity of a central portion in the horizontal direction of the image formed by the plurality of image forming elements, and the control portion is formed to control the laser beam generation portion to repeat the output of the laser beam and the stoppage of the output by a first frequency consisting of a plurality of times in the image forming elements in the vicinity of both end portions where the speed for scanning the laser beam is at a minimum and to control the laser beam generation portion to perform the output of the laser beam and the stoppage of the output by a second frequency smaller than the first frequency in the image forming elements in the vicinity of the central portion where the speed for scanning the laser beam is at a maximum. When forming the display device in this manner, speckle noise can be reduced and the picture can be inhibited from occurrence of brightness unevenness while ensuring sufficient brightness for the image forming elements by repeating the output of the laser beam and the stoppage of the output by the first frequency consisting of the plurality of times in a case of projecting the vicinity of both end portions where the speed for scanning the laser beam is at the minimum. Also in a case of projecting the vicinity of the central portion where the speed for scanning the laser beam is at the maximum, the magnitude of the image forming elements projected by performing the output of the laser beam and the stoppage of the output by the first frequency in the vicinity of the central portion where the speed for scanning the laser beam is at the maximum can be rendered substantially identical to the magnitude of the image forming elements projected by repeating the output of the laser beam and the stoppage of the output by the second frequency in the vicinity of both end portions where the speed for scanning the laser beam is at the minimum by performing the output of the laser beam and the stoppage of the output by the second frequency smaller than the first frequency, whereby speckle noise can be reduced and the picture can be inhibited from occurrence of brightness unevenness while projecting the image forming elements substantially identical in magnitude to the image forming elements in the area where the speed for scanning the laser beam is low.

Preferably in the aforementioned display device according to the first aspect, the control portion is formed to control the laser beam generation portion to change an area for stopping the output of the laser beam in an area including a boundary portion between adjacent image forming elements. When forming the display device in this manner, a spot position of the laser beam on a screen can be changed, whereby a scattering pattern of the laser beam on the screen can be changed. Thus, the position of speckle noise can be changed following fluctuation of the scattering pattern of the laser beam, whereby the speckle noise can be rendered hardly visually recognizable as compared with a case of not changing the area for stopping the output of the laser beam.

Preferably in this case, the control portion is formed to control the laser beam generation portion not to output the laser beam so that the vicinity of a rear end portion, the vicinity of a central portion or the vicinity of a front end portion of a stop period for the output of the laser beam and the vicinity of a boundary portion between adjacent image forming elements coincide with each other, and the control portion is formed to control the laser beam generation portion to stop the output of the laser beam by alternately changing such control that the vicinity of the boundary portion between adjacent image forming elements and the vicinity of the rear end portion of the stop period for the output of the laser beam coincide with each other, such control that the vicinity of the boundary portion between adjacent image forming elements and the vicinity of the central portion of the stop period for the output of the laser beam coincide with each other and such control that the vicinity of the boundary portion between adjacent image forming elements and the vicinity of the front end portion of the stop period for the output of the laser beam coincide with each other. When forming the display device in this manner, the spot position of the laser beam on the screen can be changed to three places, whereby the scattering pattern of the laser beam on the screen can be reliably changed as compared with a case where the spot position is fixed to one place.

Preferably in the aforementioned display device performing the control of changing the area for stopping the output of the laser beam, the control portion is formed to perform control of changing a position for stopping the output of the laser beam in a period of not more than one frame period. When forming the display device in this manner, the spot position of the laser beam on the screen can be fluctuated every frame, whereby the scattering pattern of the laser beam on the screen can be fluctuated every frame. Thus, the position of speckle noise can be fluctuated following fluctuation of the scattering pattern of the laser beam every frame, whereby the speckle noise can be rendered more hardly visually recognizable. The one frame period denotes a period for projecting one image frame.

Preferably in this case, the control portion is formed to perform control of changing the position for stopping the output of the laser beam every frame. When forming the display device in this manner, the spot position of the laser beam on the screen can be changed every frame, whereby the scattering pattern of the laser beam on the screen can be reliably changed every frame, dissimilarly to a case of not changing the spot position of the laser beam on the screen every frame.

Preferably in the aforementioned display device performing the control of changing the position for stopping the output of the laser beam, the control portion is formed to perform control of changing the position for stopping the output of the laser beam so that a spot position of the laser beam in the image forming elements changes. When forming the display device in this manner, the spot position of the laser beam on the screen changes, whereby the scattering pattern of the laser beam on the screen can be reliably changed.

Preferably, the aforementioned display device according to the first aspect further includes a display device body storing the laser beam generation portion, the projection portion and the control portion, and the display device body consists of a portable display device body carried by a user. When forming the display device in this manner, the display device body storing the laser beam generation portion miniaturizable as compared with a halogen lamp or the like can be miniaturized. Thus, a display device carriable by the user can be easily obtained.

A portable apparatus having a projector function according to a second aspect of the present invention includes a display device including a laser beam generation portion supplied with current thereby outputting a laser beam, a projection portion projecting an image formed by a plurality of image forming elements on an arbitrary projection area by scanning the laser beam and a control portion continuously supplying current to the laser beam generation portion nonstop for a period longer than a first period when such relaxation oscillation occurs that the output of the laser beam becomes unstable at the initial lasing stage thereby controlling the laser beam generation portion to output the laser beam and controlling the supply of the current to the laser beam generation portion to stop the output of the laser beam at least once in a second period scanning one image forming element, as hereinabove described.

In this portable apparatus having a projector function according to the second aspect, as hereinabove described, a laser beam of a stable output can be generated in a period after the first period when relaxation oscillation occurs by continuously supplying current to the laser beam generation portion nonstop for the period longer than the first period when such relaxation oscillation occurs that the output of the laser beam becomes unstable at the initial lasing stage thereby controlling the laser beam generation portion to output the laser beam, whereby an average light output can be stabilized, and a picture can be displayed in a state where brightness is stable as a result, dissimilarly to a case of outputting the laser beam only in a period of not more than the first period when the relaxation oscillation occurs. Thus, the displayed picture can be inhibited from occurrence of brightness unevenness. Further, the output of the laser beam is stopped at least once in the second period scanning one image forming element so that the output of the laser beam is stopped in the second period scanning one image forming element, whereby a period when light interferes can be inhibited from lengthening also in a case where laser beams overlap with each other to cause interference of light. Thus, occurrence of speckle noise can be suppressed as compared with a case of not stopping the output of the laser beam in the second period scanning one image forming element. Thus, the picture can be inhibited from occurrence of brightness unevenness while reducing speckle noise in the laser beam.

Preferably in the aforementioned portable apparatus having a projector function according to the second aspect, the control portion is formed to control the laser beam generation portion to stop the output of the laser beam when scanning an area including a boundary portion between adjacent image forming elements. When forming the portable apparatus in this manner, the laser beam can be inhibited from being continuously output on the boundary portion between the adjacent image forming elements, whereby the image forming element immediately at the back of the boundary portion can be projected with desired brightness without being influenced by the brightness of the image forming element immediately in front of the boundary portion. Thus, color unevenness can be inhibited from occurring on the boundary portion between the adjacent image forming elements due to the laser beam continuously output on the boundary portion between the adjacent image forming elements.

Preferably in this case, the control portion is formed to control the laser beam generation portion to repeat the output of the laser beam and stoppage of the output and to control the laser beam generation portion not to output the laser beam in a range including the boundary portion between the adjacent image forming elements by adjusting the second period scanning the image forming elements so that a stop period for the output of the laser beam and a terminal portion of the second period scanning one image forming element overlap with each other. When forming the portable apparatus in this manner, the output of the laser beam can be reliably stopped on a portion corresponding to the boundary portion between the adjacent image forming elements also in a case where the output of the laser beam and the stoppage of the output are repeatedly performed.

Preferably in the aforementioned portable apparatus having a projector function according to the second aspect, the projecting portion is formed to project the image formed by the plurality of image forming elements while changing the speed for scanning the laser beam, and the control portion is formed to control the laser beam generation portion to repeat the output of the laser beam and the stoppage of the output by a first frequency consisting of a plurality of times in the image forming elements corresponding to an area where the speed for scanning the laser beam is low and to control the laser beam generation portion to perform the output of the laser beam and the stoppage of the output by a second frequency smaller than the first frequency in the image forming elements corresponding to an area where the speed for scanning the laser beam is high. When forming the portable apparatus in this manner, speckle noise can be reduced while ensuring sufficient brightness for the image forming elements and the picture can be inhibited from occurrence of brightness unevenness by repeating the output of the laser beam and the stoppage of the output by the first frequency consisting of the plurality of times in a case of projecting the area where the speed for scanning the laser beam is low. Also in a case of projecting the area where the speed for scanning the laser beam is high, the magnitude of the image forming elements projected by performing the output of the laser beam and the stoppage of the output by the first frequency in the area where the speed for scanning the laser beam is high can be rendered substantially identical to the magnitude of the image forming elements projected by repeating the output of the laser beam and the stoppage of the output by the second frequency in the area where the speed for scanning the laser beam is low by performing the output of the laser beam and the stoppage of the output by the second frequency smaller than the first frequency, whereby speckle noise can be reduced and the picture can be inhibited from occurrence of brightness unevenness while projecting the image forming elements substantially identical in magnitude to the image forming elements in the area where the speed for scanning the laser beam is low. Thus, speckle noise can be reliably reduced and the picture can be inhibited from occurrence of brightness unevenness while projecting the image forming elements so that the magnitudes of the respective image forming elements are substantially identical to each other also in a case where the speed for scanning the laser beam changes.

Preferably in the aforementioned portable apparatus having a projector function according to the second aspect, the control portion is formed to control the laser beam generation portion to change an area for stopping the output of the laser beam in an area including a boundary portion between adjacent image forming elements. When forming the portable apparatus in this manner, a spot position of the laser beam on a screen can be changed, whereby a scattering pattern of the laser beam on the screen can be changed. Thus, the position of speckle noise can be changed following fluctuation of the scattering pattern of the laser beam, whereby the speckle noise can be rendered hardly visually recognizable as compared with a case of not changing the area for stopping the output of the laser beam.

MODES FOR CARRYING OUT THE INVENTION

Embodiments embodying the present invention are now described on the basis of the drawings.

(First Embodiment)

The structure of a portable projector 100 according to a first embodiment is described with reference to FIGS. 1 to 6. The portable projector 100 is an example of the "display device" or the "portable apparatus having a projector function" in the present invention.

Figure 1:
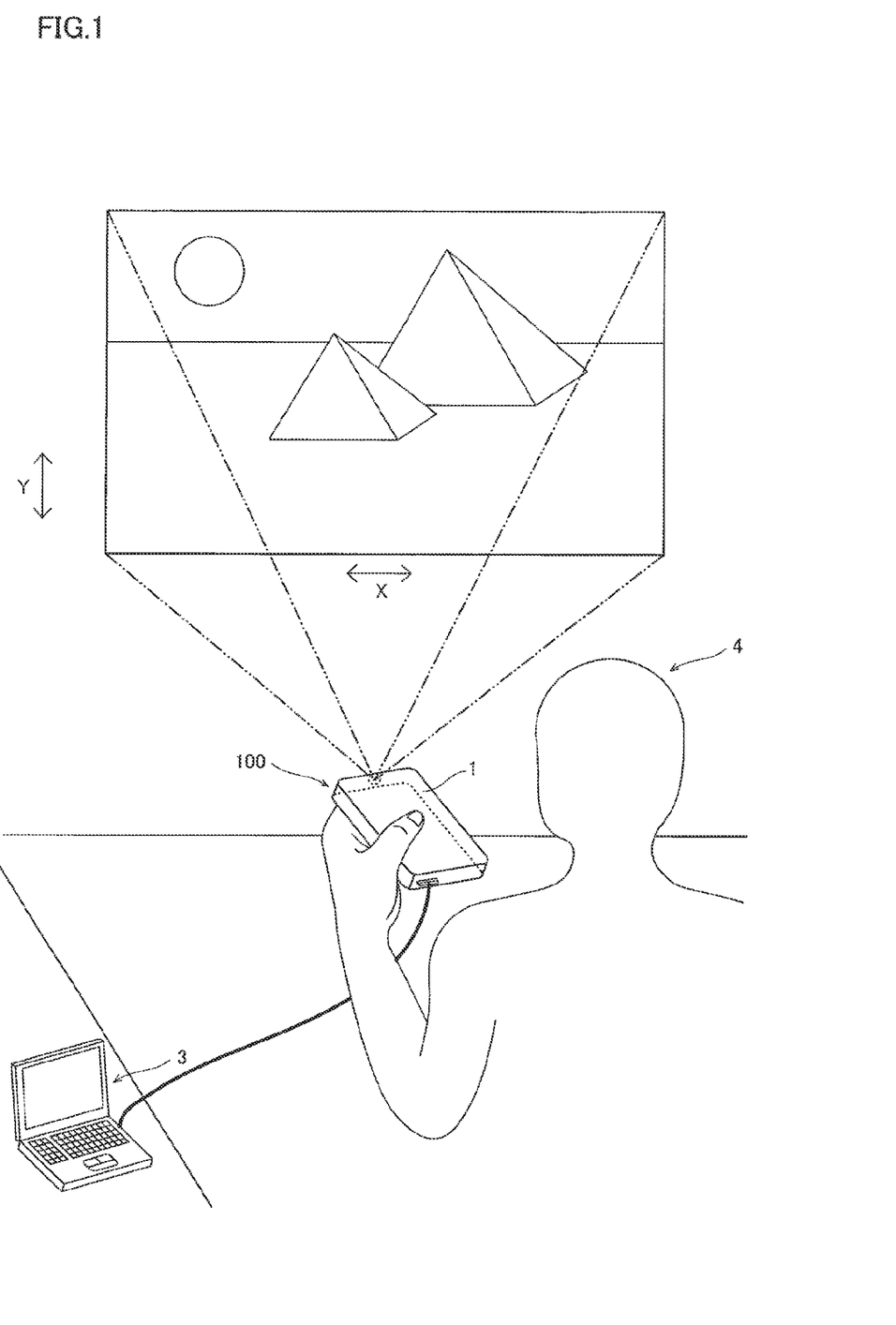
[FIG. 1] A diagram showing a used state of a portable projector according to a first embodiment of the present invention.

The portable projector 100 according to the first embodiment of the present invention is formed to project laser beams (RGB laser beams) of three colors of red, green and blue on a projection range 2 consisting of an X-Y plane, as shown in FIG. 1. The portable projector 100 is so formed that the RGB laser beams are scanned at this time to be capable of projecting a picture (image) formed by a plurality of pixels (image forming elements) on the projection range 2. Further, the portable projector 100 is formed to be connected with a personal computer 3 through a picture input interface 10 (see FIG. 2), thereby projecting a picture input from the personal computer 3 on the projection range (screen) 2. In addition, the portable projector 100 is formed to be usable in a state where a user 4 carries the same. Further, the portable projector 100 is so formed that power is supplied thereto by an unshown galvanic cell (battery or the like).

Figure 2:
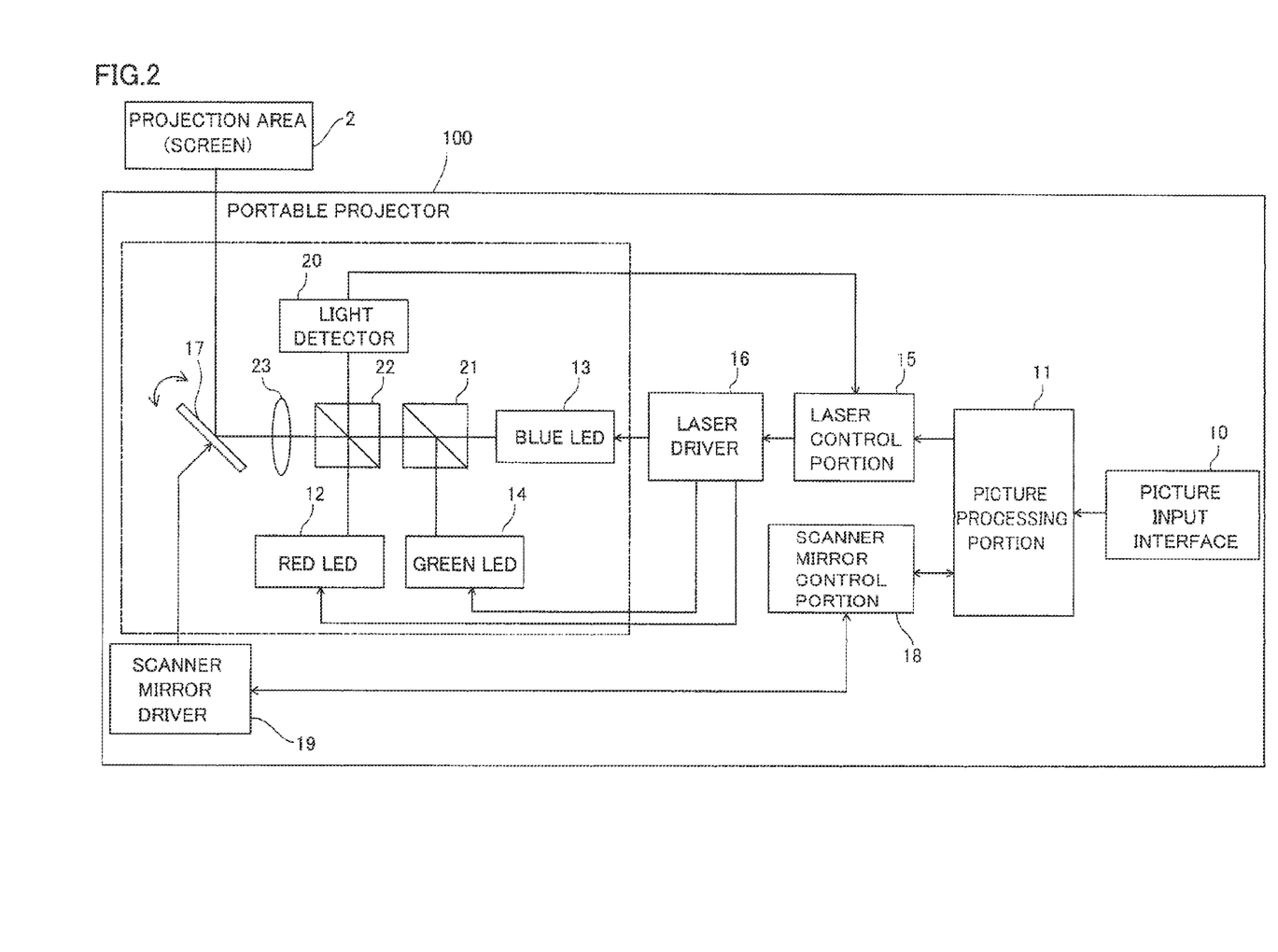
[FIG. 2] A block diagram showing the state of the portable projector shown in FIG. 1.

The circuit structure of the portable projector 100 is now described. The portable projector 100 includes a picture processing portion 11, a red laser diode (red LD) 12 capable of outputting a red laser beam, a blue laser diode (blue LD) 13 capable of outputting a blue laser beam, a green laser diode (green LD) 14 capable of outputting a green laser beam, a laser control portion 15 and a laser driver 16, as shown in FIG. 2. The red LE 12, the blue LD 13 and the green LD 14 are examples of the "laser beam generation portion" in the present invention respectively. The laser control portion 15 and the laser driver 16 are examples of the "control portion" in the present invention. These circuits of the portable projector 100 and an optical system described later are stored in a projector body (housing) 1. The projector body 1 is an example of the "display device body" in the present invention.

The picture processing portion 11 is formed to generate video signal clocks (see FIGS. 5 and 6) at a constant time interval T on the basis of a picture signal input from the personal computer 3 (see FIG. 1). Further, the picture processing portion 11 is formed to transmit video signal data (see FIGS. 5 and 6) corresponding to single pixels (image forming elements) to the laser control portion 15 at the constant time interval T. Thus, it becomes possible for the laser control portion 15 to recognize pixel (image forming element) information on a certain prescribed scanning position.

The laser control portion 15 is formed to control the laser driver 16 on the basis of the pixel information recognized by the picture processing portion 11. The laser driver 16 is formed to drive the red LD 12, the blue LD 13 and the green LD 14 on the basis of control by the laser control portion 15. More specifically, the laser driver 16 is formed to repeatedly perform control of supplying current of a magnitude of at least lasing threshold current $I_{th}$ (see FIG. 3) to the red LD 12, the blue LD 13 and the green LD 14 at the constant time interval T (see FIGS. 5 and 6) and control of lowering the current to a magnitude of less than the lasing threshold current $I_{th}$ on the basis of the control by the laser control portion 15. The remaining structure of the laser control portion 15 is described later in detail.

Figure 3:
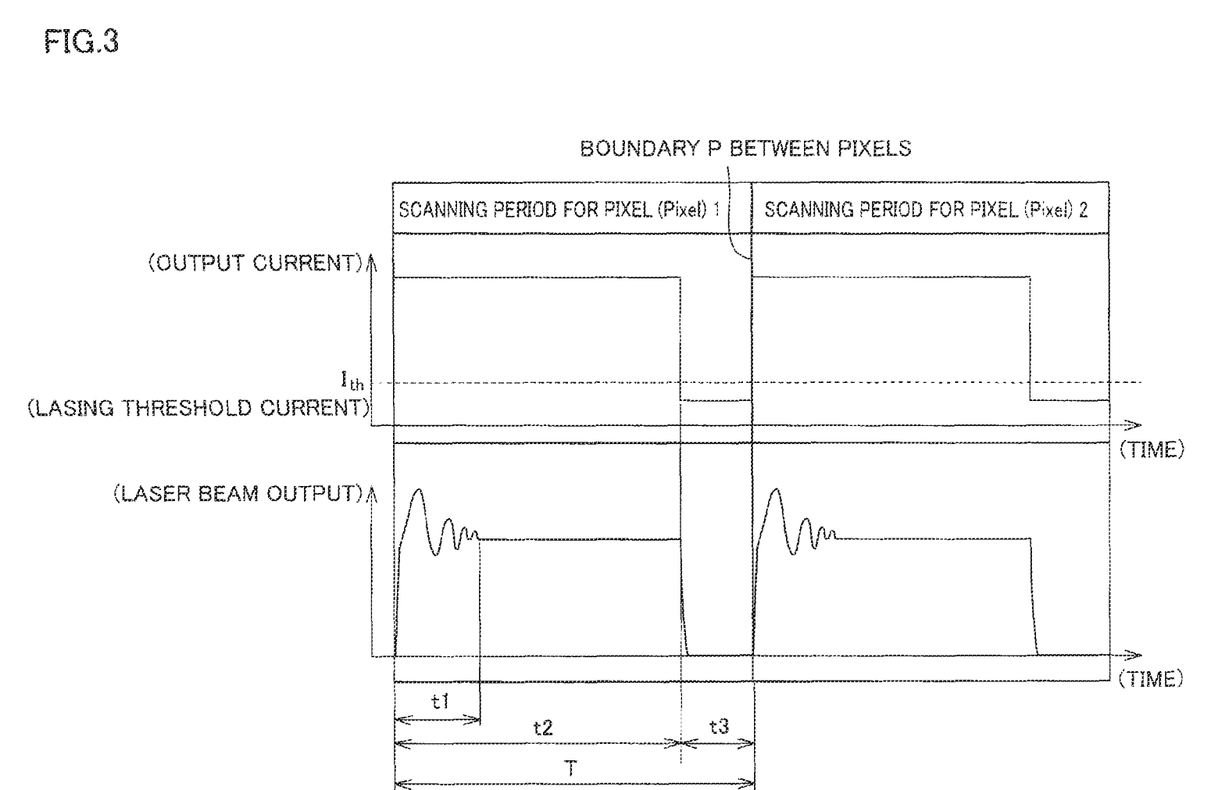
[FIG. 3] A timing chart showing the relation between current and beam outputs in laser diodes of the portable projector shown in FIG. 1.

The red LD 12, the blue LD 13 and the green LD 14 have properties of general laser diodes respectively, as shown in FIG. 3. In other words, light emission by induced emission is performed in the red LD 12, the blue LD 13 and the green LD 14 respectively, in a case where the supplied current is at least a constant value (lasing threshold current $I_{th}$). Thus, it becomes possible to output the laser beams in a case where current of at least the lasing threshold current $I_{th}$ is supplied to the red LD 12, the blue LD 13 and the green LD 14. In a case where current of less than the lasing threshold current $I_{th}$ is supplied to the red LD 12, the blue LD 13 and the green LD 14, it becomes possible to stop the outputs of the outputs of the laser beams. The red LD 12, the blue LD 13 and the green LD 14 are so formed that laser beams having high brightness are output as the value of the supplied current enlarges respectively.

According to the first embodiment, the laser beams output from the red LD 12, the blue LD 13 and the green LD 14 exhibit such oscillation phenomena that shapes of the output laser beams become waveform shapes at the initial lasing stages. These waveform shapes exhibit shapes gradually attenuating as the times for outputting the laser beams elapse, and such an oscillation phenomenon that a laser beam in an initial laser oscillation stage becomes unstable is referred to as relaxation oscillation. This relaxation oscillation converges on a constant output when a prescribed period t1 (about 3 nsec) elapses. The prescribed period t1 (about 3 nsec) is an example of the "first period" in the present invention.

The portable projector 100 further includes a scanner mirror 17, a scanner mirror control portion 18, a scanner mirror driver 19 driving the scanner mirror 17, and a light detector 20 detecting graduations possessed by the RGB laser beams. The scanner mirror 17 is a miniature vibrating mirror element driven by the scanner mirror driver 19 and vibratory at a prescribed vibration angle. The scanner mirror control portion 18 is formed to control the scanner mirror driver 19 on the basis of the pixel information on the certain prescribed scanning position recognized in the picture processing portion 11. In other words, the scanner mirror 17 is formed to be vibrated to scan the RGB laser beams toward the horizontal direction (direction X (see FIG. 1)) of the projection range 2 on the basis of control by the scanner mirror control portion 18. The scanner mirror 17 is an example of the "projection portion" in the present invention.

The light detector 20 is arranged to be capable of detecting the laser beams from the red LD 12, the blue LD 13 and the green LD 14. Further, the light detector 20 is connected with the laser control portion 15, and formed to output the gradations of the detected laser beams to the laser control portion 15. The laser control portion 15 is formed to determine whether or not the gradations are correct gradations as compared with the pixel information on the scanning position on the basis of the gradations input from the light detector 20 and to adjust the outputs (brightness) of the red LD 12, the blue LD 13 and the green LD 14 so that the gradations become correct gradations in a case where the same are not correct gradations.

The structure of the optical system of the portable projector 100 is now described. The optical system of the portable projector 100 includes two half mirrors 21 and 22 and a lens 23, in addition to the red LD 12, the blue LD 13, the green LD 14, the scanner mirror 17 and the light detector 20. The half mirror 21 is arranged on a position where the blue laser beam and the green laser beam perpendicularly intersect with each other. This half mirror 21 is formed to transmit the blue laser beam and to reflect the green laser beam. The half mirror 22 is arranged on a position where the blue laser beam and the green laser beam passing through the half mirror 21 and the red laser beam perpendicularly intersect with each other. The half mirror 22 is formed to reflect parts of the blue laser beam and the green laser beam to the side of the light detector 20 and to transmit the rests other than the parts of the blue laser beam and the green laser beam to the side of the lens 23. Further, the half mirror 22 is formed to transmit a part of the red laser beam to the side of the light detector 20 and to reflect the rest other than the part of the red laser beam to the side of the lens 23. The lens 23 has a function of aligning optical axes of the red laser beam, the blue laser beam and the green laser beam with each other and converting the laser beams to RGB laser beams having prescribed gradations. The RGB laser beams whose optical axes are aligned with each other in the lens 23 are formed to be scanned toward the projection range 2 by being reflected by the scanner mirror 17.

Figure 4:
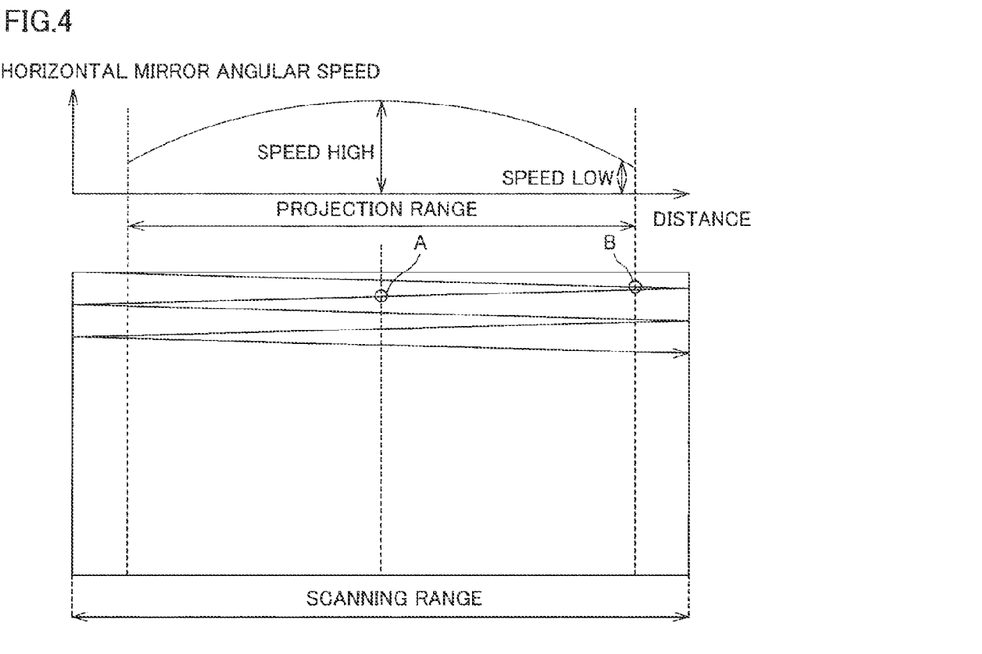
[FIG. 4] A diagram for illustrating scanning speeds and scanning ranges of laser beams of the portable projector shown in FIG. 1.

According to the first embodiment, the scanner mirror 17 is formed to project the picture (image) formed by the plurality of pixels (image forming elements) while changing the speed for scanning the RGB laser beams, as shown in FIG. 4. More specifically, the scanner mirror 17 is so formed that an angular speed at which the scanner mirror 17 is vibrated in the horizontal direction (direction X (see FIG. 1)) of the projection range 2 is maximized in the vicinity A of a central portion in the horizontal direction (direction X) of the projection range 2 and to be minimized in the vicinity B of both end portions in the horizontal direction (direction X) of the projection range 2. In other words, the scanner mirror 17 is so formed that a scanning speed in the vicinity A of the central portion in the horizontal direction (direction X) of the projection range 2 is higher than a scanning speed in the vicinity B of both end portions in the horizontal direction (direction X) of the projection range 2 in a case where the scanner mirror 17 is vibrated in the horizontal direction (direction X (see FIG. 1)) of the projection range 2.

The structure of the laser control portion 15 is now described in detail. The laser control portion 15 is formed to continuously perform control of supplying current to the red LD 12, the blue LD 13 and the green LD 14 nonstop for an on-period t2 (about 7 nsec) longer than the period t1 (about 3 nsec) of relaxation oscillation, as shown in FIG. 3. In other words, the laser control portion 15 is formed to control the red LD 12, the blue LD 13 and the green LD 14 to output the laser beams for the on-period t2 (about 7 nsec) longer than the period t1 (about 3 nsec) of relaxation oscillation. This on-period t2 (about 7 nsec) for supplying the current to the red LD 12, the blue LD 13 and the green LD 14 is a period shorter than a period (about 10 nsec to about 30 nsec, for example) when the scanner mirror 17 scans one pixel (image forming element). Further, the laser control portion 15 is formed to perform control of suppressing the supply of the current to the red LD 12, the blue LD 13 and the green LD 14 to less than the lasing threshold current $I_{th}$) to stop (to turn off) the outputs of the laser beams at least once in the period (about 10 nsec to about 30 nsec, for example) when the scanner mirror 17 scans one pixel. An off-period t3 for stopping the outputs of these laser beams is about 3 nsec. In addition, the laser control portion 15 is formed to control the red LD 12, the blue LD 13 and the green LD 14 so that a period excluding the period t1 when relaxation oscillation occurs within the period t2 when the laser beams are output from the red LD 12, the blue LD 13 and the green LD 14 is longer than the period t3 when the laser beams are not output. Further, the laser control portion 15 is formed to repeatedly perform ON and OFF of the outputs of the laser beams from the red LD 12, the blue LD 13 and the green LD 14 every time interval T (every cycle of video signal clocks) which is the same timing as the cycle of the video signal clocks, as described above. The period (about 10 nsec to about 30 nsec, for example) scanning one pixel is an example of the "second period" in the present invention.

Figure 6:
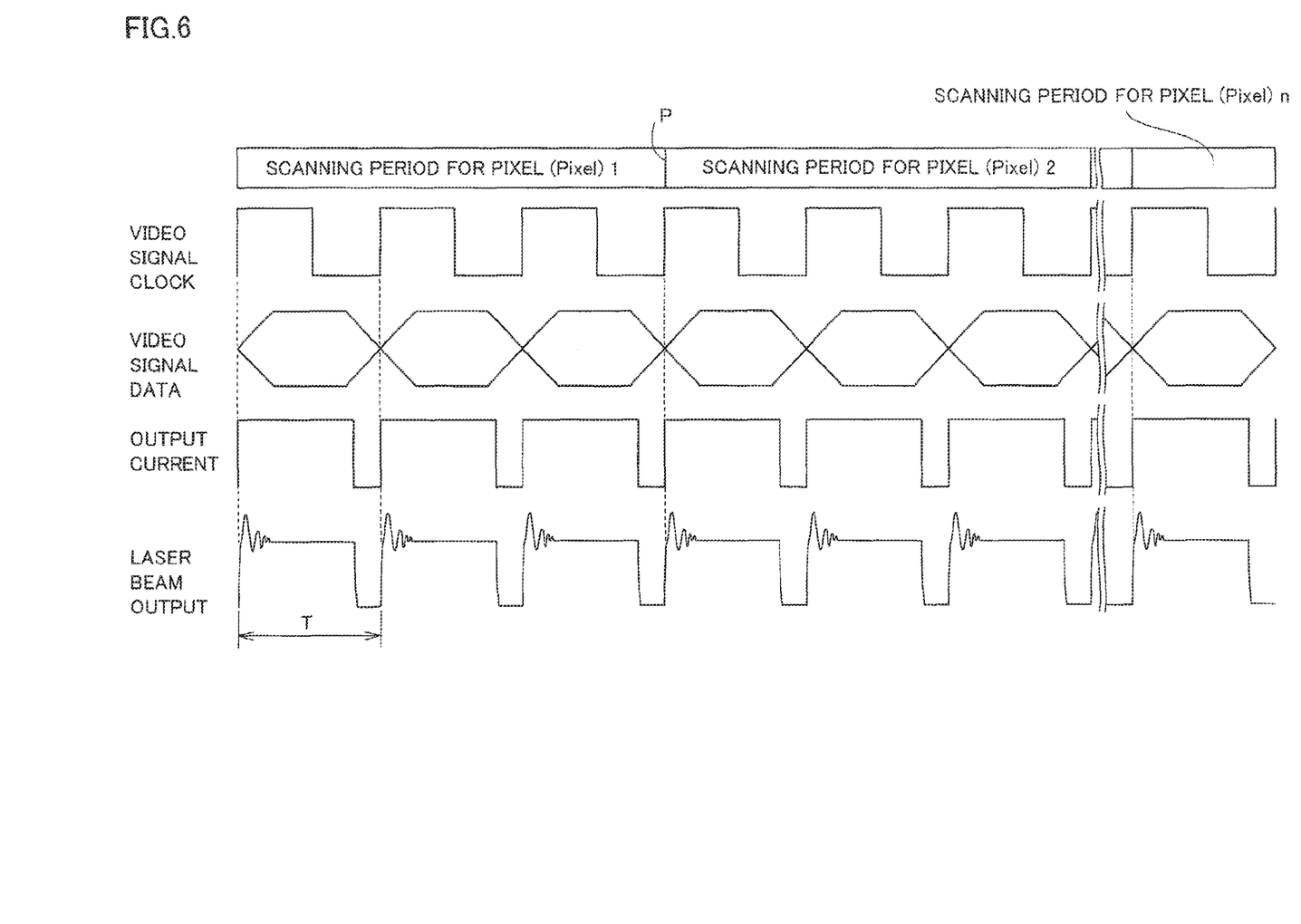
[FIG. 6] A timing chart showing the relation the relation between image forming elements and laser beam outputs in a case where the scanning speed of the laser beams of the portable projector shown in FIG. 1 is low.

The laser control portion 15 is formed to perform control of the red LD 12, the blue LD 13 and the green LD 14 to repeat the outputs of the laser beams and stoppage of the outputs a plurality of times (three times) in pixels (image forming elements) corresponding to an area (B in FIG. 4, for example) where the speed for scanning the RGB laser beams is small, as shown in FIG. 6. The plurality of times (three times) are examples of the "first frequency" in the present invention. Further, the laser control portion 15 is formed to perform control of the red LD 12, the blue LD 13 and the green LD 14 to perform the outputs of the laser beams and stoppage of the outputs once in pixels (image forming elements) corresponding to an area (A in FIG. 4, for example) where the speed for scanning the RGB laser beams is high. This once is an example of the "second frequency" in the present invention. In general, the width (magnitude) of one pixel (image forming element) has the same magnitude, and it becomes possible to render the width of the pixel substantially constant by varying the frequency for performing the outputs of the laser beams and the stoppage of the outputs with the speed for scanning the laser beams as described above.

Figure 5:
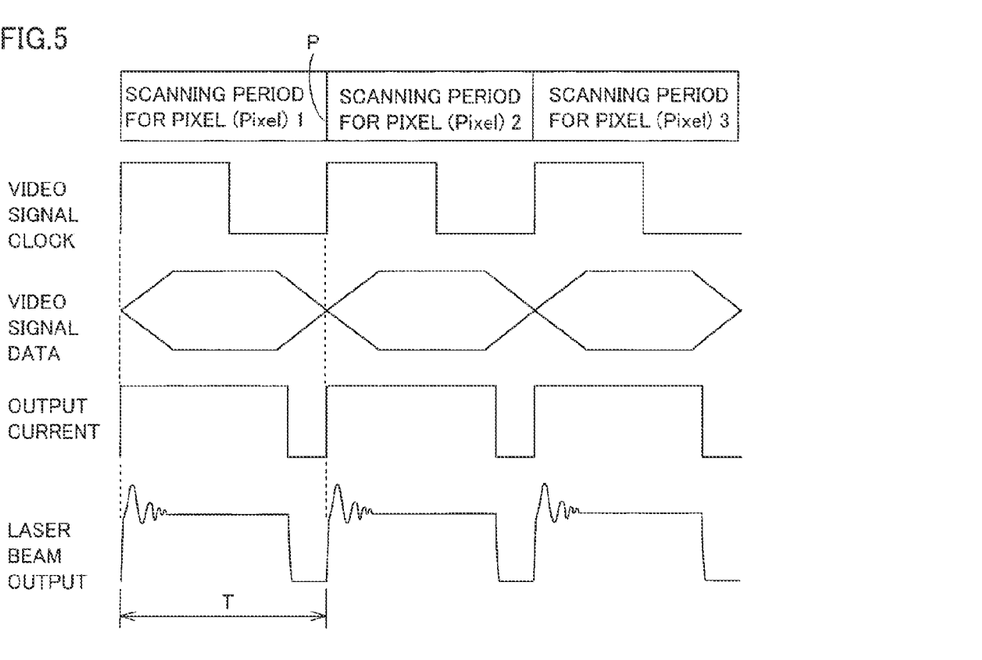
[FIG. 5] A timing chart showing the relation the relation between image forming elements and laser beam outputs in a case where the scanning speed of the laser beams of the portable projector shown in FIG. 1 is high.

According to the first embodiment, the laser control portion 15 is formed to control the red LD 12, the blue LD 13 and the green LD 14 to stop the outputs of the laser beams in an area including a boundary portion between adjacent image forming elements (a pixel (Pixel) 1 and a pixel (Pixel) 2, for example), as shown in FIGS. 3, 5 and 6. More specifically, the laser control portion 15 is formed to control the red LD 12, the blue LD 13 and the green LD 14 to stop the outputs of the laser beams so that the boundary portion (boundary P between pixels) between the adjacent image forming elements (the pixel (Pixel) 1 and the pixel (Pixel) 2, for example) and rear end portions of output stop areas of the laser beams coincide with each other.

According to the first embodiment, the laser control portion 15 is formed to perform control of adjusting magnitudes of pixels so that terminal portions (boundaries P between pixels) of image forming elements (pixels) are located on positions corresponding to an output stop time (off-period t3) of the laser beams by the red LD 12, the blue LD 13 and the green LD 14. In other words, the laser control portion 15 is formed to perform control of finely adjusting widths of pixels in order to coincide the terminal portions (boundaries P between pixels) of pixels with the output stop time (off-period t3) of the laser beams. More specifically, the laser control portion 15 is formed to adjust widths (magnitudes) of image forming elements so that a terminal portion (boundary P between the pixels) of an image forming element (pixel (Pixel) 1, for example) is located on a projection area corresponding to a stop time (off-period t3) of the outputs of the laser beams by the red LD 12, the blue LD 13 and the green LD 14.

According to the first embodiment, as hereinabove described, the laser control portion 15 continuously supplies the current to the red LD 12, the blue LD 13 and the green LD 14 nonstop for the period longer than the prescribed period t1 (about 3 nsec) when such relaxation oscillation occurs that the outputs of the laser beams become unstable thereby controlling the red LD 12, the blue LD 13 and the green LD 14 to output the laser beams so that laser beams of stable outputs can be generated after the prescribed period t1 when relaxation oscillation occurs, whereby the picture can be displayed in a state where brightness is stable, dissimilarly to a case of outputting the laser beams only in a period of not more than the prescribed period t1 when relaxation oscillation occurs.

Thus, the displayed picture can be inhibited from occurrence of brightness unevenness. Further, the outputs of the laser beams are stopped at least once in the period scanning one pixel (image forming element) so that the outputs of the laser beams are stopped in the period scanning one pixel (image forming element), whereby a period when light interferes can be inhibited from lengthening also in a case where the laser beams overlap with each other to cause interference of light. Thus, occurrence of speckle noise can be suppressed as compared with a case of not performing stoppage of the outputs of the laser beams in the period scanning one pixel (image forming element). Thus, the picture can be inhibited from occurrence of brightness unevenness while reducing speckle noise in the laser beams.

According to the first embodiment, as hereinabove described, the laser control portion 15 controls the red LD 12, the blue LD 13 and the green LD 14 to stop the outputs of the laser beams in the area including the boundary portion (boundary P between pixels) between the adjacent pixels (image forming elements) so that the laser beams can be inhibited from being continuously output on the boundary portion (boundary P between pixels) between the adjacent pixels (image forming elements), whereby the image forming element (pixel (Pixel) 2, for example) immediately at the back of the boundary portion (boundary P between pixels) can be projected with desired brightness without being influenced by the brightness of the image forming element (pixel (Pixel) 1, for example) immediately in front of the boundary portion (boundary P between pixels). Thus, the boundary portion (boundary P between pixels) between the adjacent pixels (image forming elements) can be inhibited from occurrence of color unevenness due to the laser outputs continuously output on the boundary portion (boundary P between pixels) between the adjacent pixels (image forming elements).

According to the first embodiment, as hereinabove described, the laser control portion 15 adjusts the period for scanning the pixels (image forming elements) so that the stop time (off-period t3) for the outputs of the laser beams and the terminal portion (boundary P between pixels) of the period for scanning one pixel (image forming element) overlap with each other thereby controlling the red LD 12, the blue LD 13 and the green LD 14 not to output the laser beams in the range including the boundary portion between the adjacent pixels (image forming elements), whereby the outputs of the laser beams can be reliably stopped on the portion corresponding to the boundary portion between the adjacent pixels also in a case where the outputs of the laser beams and the stoppage of the outputs are repeatedly performed at the constant time interval T.

According to the first embodiment, as hereinabove described, the laser control portion 15 controls the red LD 12, the blue LD 13 and the green LD 14 so that the period excluding the period t1 when relaxation oscillation occurs within the period when the laser beams are output from the red LD, blue LD 13 and the green LD 14 is longer than the period when the laser beams are not output, whereby sufficient brightness for the image forming elements (pixels) can be ensured, dissimilarly to a case where the period when the laser beams are not output is longer than the period excluding the period t1 when relaxation oscillation occurs within the period when the laser beams are output from the red LD 12, blue LD 13 and the green LD 14.

According to the first embodiment, as hereinabove described, the laser control portion 15 repeatedly performs the control of supplying the current of the magnitude of at least the lasing threshold current $I_{th}$ to the red LD 12, the blue LD 13 and the green LD 14 thereby controlling the same to output the laser beams and the control of lowering the current to the magnitude of less than the lasing threshold current $I_{th}$ thereby controlling the red LD 12, the blue LD 13 and the green LD 14 not to output the laser beams, whereby the outputs of the laser beams and the stoppage of the outputs can be performed in the state regularly supplying the current to the red LD 12, the blue LD 13 and the green LD 14.

According to the first embodiment, as hereinabove described, the laser control portion 15 repeatedly controls the red LD 12, the blue LD 13 and the green LD 14 to output the laser beams and to stop the outputs every cycle of the video signal clocks transmitted by the picture processing portion 11, whereby the outputs of the laser beams and the stoppage of the outputs can be easily performed by employing the video signal clocks transmitted by the picture processing portion 11.

According to the first embodiment, as hereinabove described, the laser control portion 15 controls the red LD 12, the blue LD 13 and the green LD 14 not to output the laser beams so that the vicinity of the rear end portion, the vicinity of the central portion or the vicinity of the front end portion of the stop period for the outputs of the laser beams and the vicinity of the boundary portion between the adjacent image forming elements (pixels) coincide with each other, whereby the outputs of the laser beams can be reliably stopped in the vicinity of the boundary portion between the adjacent image forming elements (pixels) also in the case where the outputs of the laser beams and the stoppage of the outputs are repeatedly performed.

According to the first embodiment, as hereinabove described, the laser control portion 15 controls the red LD 12, the blue LD 13 and the green LD 14 to repeat the outputs of the laser beams and the stoppage of the outputs three times in the pixels (image forming elements) corresponding to the area (B in FIG. 4, for example) where the speed for scanning the laser beams is small, whereby speckle noise can be reduced while ensuring sufficient brightness for the pixels and the picture can be inhibited from occurrence of brightness unevenness by repeating the outputs of the laser beams and the stoppage of the outputs three times. Also in a case of projecting an area (A in FIG. 4, for example) where the speed for scanning the laser beams is high, the magnitude of image forming elements (pixels) projected by performing the outputs of the laser beams and the stoppage of the outputs once in the area (A in FIG. 4, for example) where the speed for scanning the laser beams is high can be rendered substantially identical to the magnitude of image forming elements (pixels) projected by repeating the outputs of the laser beams and the stoppage of the outputs three times in the area (B in FIG. 4, for example) where the speed for scanning the laser beams is small, whereby speckle noise can be reduced and the picture can be inhibited from occurrence of brightness unevenness while projecting image forming elements of a magnitude substantially identical to that of the image forming elements (pixels) in the area (B in FIG. 4, for example) where the speed for scanning the laser beams is small. Thus, speckle noise can be reliably reduced and the picture can be inhibited from occurrence of brightness unevenness while projecting the image forming elements so that the magnitudes of the respective image forming elements (pixels) are substantially identical to each other also in a case where the speed for scanning the laser beams changes.

According to the first embodiment, as hereinabove described, the laser control portion 15 controls the red LD 12, the blue LD 13 and the green LD 14 to repeat the outputs of the laser beams and the stoppage of the outputs three times in the image forming elements (pixels) in the vicinity of both end portions where the speed for scanning the laser beams is at the minimum and controls the red LD 12, the blue LD 13 and the green LD 14 to perform the outputs of the laser beams and the stoppage of the outputs once in the image forming elements (pixels) in the vicinity of the central portion where the speed for scanning the laser beams is at the maximum, whereby speckle noise can be reduced while ensuring sufficient brightness for the image forming elements (pixels) and the picture can be inhibited from occurrence of brightness unevenness by repeating the outputs of the laser beams and the stoppage of the outputs three times in a case of projecting the vicinity of both end portions where the speed for scanning the laser beams is at the minimum. Also in a case of projecting the vicinity of the central portion where the speed for scanning the laser beams is at the maximum, the magnitude of the image forming elements (pixels) projected by performing the outputs of the laser beams and the stoppage of the outputs once can be rendered substantially identical to the magnitude of the image forming elements (pixels) projected by repeating the outputs of the laser beams and the stoppage of the outputs three times in the vicinity of both end portions where the speed for scanning the laser beams is at the minimum by performing the outputs of the laser beams and the stoppage of the outputs once, whereby speckle noise can be reduced and the picture can be inhibited from occurrence of brightness unevenness while projecting the image forming elements (pixels) of a magnitude substantially identical to that of the image forming elements (pixels) in the area where the speed for scanning the laser beams is small.

According to the first embodiment, as hereinabove described, the portable projector 100 is formed to be a miniature projector carriable by the user 4, whereby the projector body 1 storing the red LD 12, the blue LD 13 and the green LD 14 consisting of the semiconductor lasers miniaturizable as compared with a halogen lap or the like can be miniaturized. Thus, the portable projector 100 carriable by the user can be obtained.

(Second Embodiment)

Figure 7:
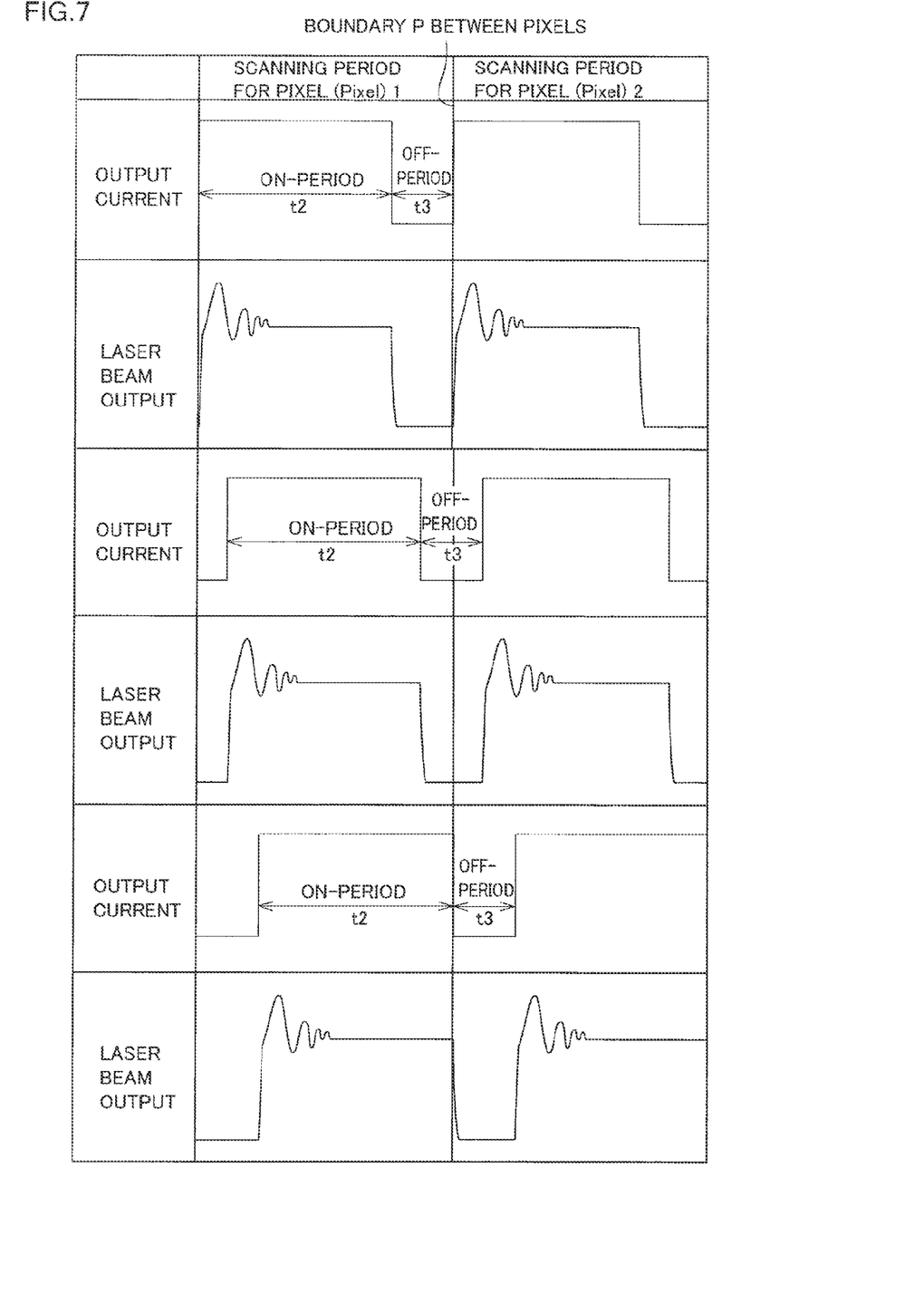
[FIG. 7] A timing chart showing the relation between current and laser beam outputs in laser diodes of a portable projector according to a second embodiment of the present invention.

A second embodiment is now described with reference to FIGS. 7 and 8. In a portable projector 200 according to this second embodiment, an example of changing an area for stopping outputs of laser beams in an area including a boundary portion (boundary P between pixels) between adjacent image forming elements is described, dissimilarly to the first embodiment stopping the outputs of the laser beams so that the boundary portion (boundary P between pixels) between the aforementioned adjacent image forming elements (the pixel (Pixel) 1 and the pixel (Pixel) 2, for example) and the rear end portion of the output stop area for the laser beams coincide with each other.

According to the second embodiment, a laser control portion 15 is formed to control a red LD 12, a blue LD 13 and a green LD 14 to stop outputs of laser beams in an area including a boundary portion between adjacent image forming elements (a pixel (Pixel) 1 and a pixel (Pixel) 2, for example). More specifically, the laser control portion 15 is formed to perform control of changing an area (off-period t3) for stopping the outputs of the laser beams on the red LD 12, the blue LD 13 and the green LD 14 in the area including the boundary portion (boundary P between pixels) between the adjacent pixels (image forming elements), as shown in FIG. 7. For example, the laser control portion 15 is formed to perform control of stopping the outputs of the laser beams so that the boundary portion (boundary P between pixels) between the adjacent image forming elements (the pixel (Pixel) 1 and the pixel (Pixel) 2) and a rear end portion of the output stop area (off-period t3) for the laser beams coincide with each other and to thereafter perform control of stopping the outputs of the laser beams so that the boundary portion (boundary P between pixels) between the adjacent image forming elements (pixels) coincides with a central portion of the output stop area (off-period t3) for the laser beams. Further, the laser control portion 15 is formed to perform control of stopping the outputs of the laser beams so that the boundary portion (boundary P between pixels) between the adjacent image forming elements (pixels) coincides with the central portion of the output stop area (off-period t3) for the laser beams and to thereafter perform control of stopping the outputs of the laser beams so that the boundary portion (boundary P between pixels) between the adjacent image forming elements (pixels) and a front end portion of the output stop area (off-period t3) for the laser beams coincide with each other.

Figure 8:
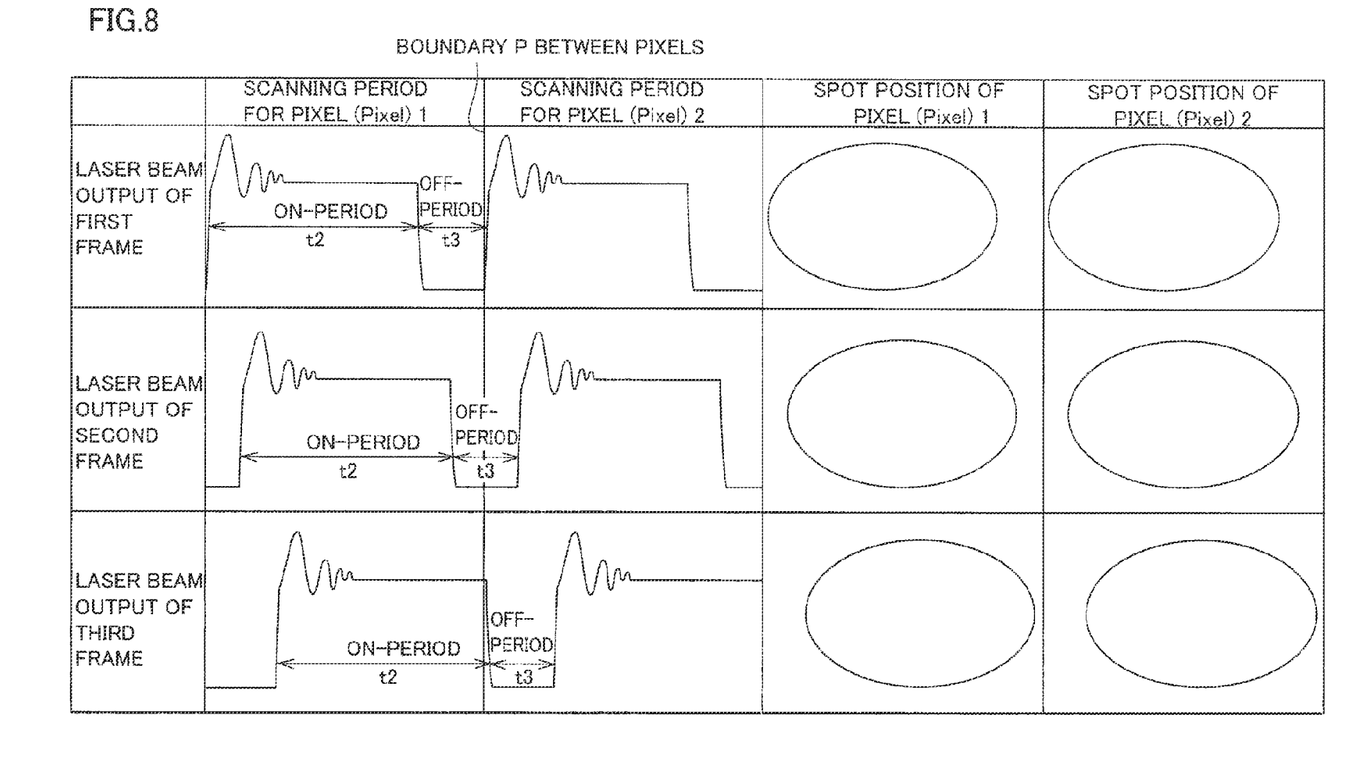
[FIG. 8] A diagram showing fluctuation of spot positions of laser beams output from the portable projector according to the second embodiment of the present invention.

According to the second embodiment, the laser control portion 15 is formed to perform control of changing positions for stopping the outputs of the aforementioned laser beams within one frame rate, as shown in FIG. 8. In other words, the laser control portion 15 is formed to perform control of changing spot positions (scanning ranges) of the laser beams in single image forming elements (pixels) every frame. The frame rate is an example of the "frame period" in the present invention.

According to the second embodiment, as hereinabove described, the spot positions of the laser beams on a projection area 2 (screen) can be changed by changing the areas for stopping the outputs of the laser beams with respect to the red LD 12, the blue LD 13 and the green LD 14 in the area including the boundary portion (boundary P between pixels) between the adjacent image forming elements (pixels), whereby scattering patterns of the laser beams on the screen can be changed. Thus, the position of speckle noise can be changed following fluctuation of the scattering patterns of the laser beams, whereby the speckle noise can be rendered hardly visually recognizable as compared with a case of not changing the areas for stopping the outputs of the laser beams.

According to the second embodiment, as hereinabove described, the laser control portion 15 controls the red LD 12, the blue LD 13 and the green LD 14 to stop the outputs of the laser beams by alternately changing such control that the vicinity of the boundary portion between the adjacent image forming elements (pixels) and the vicinity of the rear end portion of the stop period for the outputs of the laser beams coincide with each other, such control that the vicinity of the boundary portion between the adjacent image forming elements (pixels) and the vicinity of the central portion of the stop period for the outputs of the laser beams coincide with each other and such control that the vicinity of the boundary portion between the adjacent image forming elements (pixels) and the vicinity of the front end portion of the stop period for the outputs of the laser beams coincide with each other so that the spot positions of the laser beams on the screen can be changed to three places, whereby the scattering patterns of the laser beams on the screen can be reliably changed as compared with a case where a spot position is fixed to one place.

According to the second embodiment, as hereinabove described, the spot positions of the laser beams on the screen can be changed every frame by changing the positions for stopping the outputs of the laser beams in a period of not more than one frame period (frame rate), whereby the scattering patterns of the laser beams on the screen can be changed every frame. Thus, the position of speckle noise can be changed following change of the scattering patterns of the laser beams every frame, whereby the speckle noise can be rendered more hardly visually recognizable.

According to the second embodiment, as hereinabove described, the spot positions of the laser beams on the screen can be changed every frame by performing the control of changing the positions for stopping the outputs of the laser beams every frame, whereby the scattering patterns of the laser beams on the screen can be reliably changed every frame, dissimilarly to a case of not changing the spot positions of the laser beams on the screen every frame.

According to the second embodiment, as hereinabove described, the laser control portion 15 is formed to perform the control of changing the positions for stopping the outputs of the laser beams so that the spot positions of the laser beams on the image forming elements (pixels) change so that the spot positions of the laser beams on the screen change, whereby the scattering patterns of the laser beams on the screen can be reliably changed.

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are included.

For example, while the example of applying the present invention to the portable projector outputting the laser beams as an example of the display device has been shown in each of the aforementioned first and second embodiments, the present invention is not restricted to this. The present invention is applicable also to a display device such as a stationary laser projector, for example, so far as the same is a display device outputting laser beams.

While the example of repeating the control of outputting the laser beams in the same on-period t2 and stopping the outputs in the same off-period t3 at the constant time interval T has been shown in each of the aforementioned first and second embodiments, the present invention is not restricted to this. For example, outputs of laser beams and stoppage of the outputs may be repeated by mixing laser beams output in a shorter time (on-period) than a period of relaxation oscillation and laser beams output in a longer time (on-period) than the period of relaxation oscillation with each other. In this case, speckle noise can be further reduced by outputting the laser beams in the shorter time (on-period) than the period of relaxation oscillation, as compared with a case of outputting the laser beams only in the longer time (on-period) than the period of relaxation oscillation.

While the example of stopping the outputs of the laser beams so that the boundary portion (boundary P between the pixels) between the adjacent image forming elements (the pixel (Pixel) 1 and the pixel (Pixel) 2) and the rear end portion of the output stop area (off-period t3) for the laser beams coincide with each other has been shown in the aforementioned first embodiment, the present invention is not restricted to this. For example, the outputs of the laser beams may be stopped so that the boundary portion (boundary P between the pixels) between the adjacent image forming elements (the pixel (Pixel) 1 and the pixel (Pixel) 2) and the front end portion of the output stop area (off-period t3) for the laser beams coincide with each other, or the outputs of the laser beams may be stopped so that the boundary portion (boundary P between the pixels) between the adjacent image forming elements (the pixel (Pixel) 1 and the pixel (Pixel) 2) and the central portion of the output stop area (off-period t3) for the laser beams coincide with each other.

While the example of setting the frequency for stopping the laser beams to once in the case where the speed for scanning the laser beams is high has been shown in each of the aforementioned first and second embodiments, the present invention is not restricted to this. The frequency for stopping the laser beams may be set to a plurality of times in the case where the speed for scanning the laser beams is high. In this case, the time when the laser beams are emitted is preferably longer than the time when the emission of the laser beams stops.

While the example of employing the scanner mirror which is a vibratory miniature vibrating mirror element as a projection portion has been shown in each of the aforementioned first and second embodiments, the present invention is not restricted to this. A member other than the mirror element may be employed so far as the same is that capable of scanning laser beams.

While the example of projecting the RGB laser beams on the projection area 2 by employing the red•blue LD 12 and the green LD 13 has been shown in each of the aforementioned first and second embodiments, the present invention is not restricted to this, but the laser beam generation portion may be formed to generate RGB laser beams from one LD (laser diode). Alternatively, the laser beam generation portion may be formed to generate only a laser beam of a single color, or may be formed to generate laser beams of two colors or at least four colors.

While the example of projecting the picture input from the personal computer on the projection area through the picture input interface has been shown in each of the aforementioned first and second embodiments, the present invention is not restricted to this. For example, a picture may be input by a method other than a signal input from an external apparatus by inputting picture data stored in a memory card through a card slot and projecting the input picture on the projection area, and the input picture may be projected on the projection area.

The invention claimed is:

1. A display device (100) comprising:
a laser beam generation portion (12, 13, 14) supplied with current thereby outputting a laser beam;
a projection portion (17) projecting an image formed by a plurality of image forming elements (1, 2) on an arbitrary projection area (2) by scanning said laser beam; and
a control portion (15) continuously supplying current to said laser beam generation portion nonstop for a period longer than a first period when such relaxation oscillation occurs that the output of said laser beam becomes unstable at the initial lasing stage thereby controlling said laser beam generation portion to output said laser beam and controlling the supply of the current to said laser beam generation portion to stop the output of said laser beam at least once in a second period scanning one image forming element.

2. The display device according to claim 1, wherein said control portion is formed to control said laser beam generation portion to stop the output of said laser beam when scanning an area including a boundary portion between adjacent said image forming elements.

3. The display device according to claim 2, wherein said control portion is formed to control said laser beam generation portion to repeat the output of said laser beam and stoppage of the output and to control said laser beam generation portion not to output said laser beam in a range including the boundary portion between said adjacent image forming elements by adjusting said second period scanning said image forming elements so that a stop period for the output of said laser beam and a terminal portion of said second period scanning one said image forming element overlap with each other.

4. The display device according to claim 3, wherein
said control portion is formed to control said laser beam generation portion so that a period excluding said first period when said relaxation oscillation occurs within a period when said laser beam is output from said laser beam generation portion is longer than a period when said laser beam is not output.

5. The display device according to claim 3, wherein
said control portion is formed to repeat control of supplying current of a magnitude of at least lasing threshold current to said laser beam generation portion thereby controlling said laser beam generation portion to output said laser beam and control of lowering the current to a magnitude of less than said lasing threshold current thereby controlling said laser beam generation portion not to output said laser beam.

6. The display device according to claim 3, further comprising a picture processing portion (11) transmitting a video signal corresponding to one said image forming element to said control portion at a prescribed time interval, wherein
said control portion is formed to control said laser beam generation portion to repeat the output of said laser beam and the stoppage of the output every cycle of said video signal transmitted by said picture processing portion.

7. The display device according to claim 3, wherein
said control portion is formed to control said laser beam generation portion not to output said laser beam so that the vicinity of a rear end portion, the vicinity of a central portion or the vicinity of a front end portion of a stop period for the output of said laser beam and the vicinity of the boundary portion between adjacent said image forming elements coincide with each other.

8. The display device according to claim 1, wherein
said projecting portion is formed to project the image formed by said plurality of image forming elements while changing the speed for scanning said laser beam, and
said control portion is formed to control said laser beam generation portion to repeat the output of said laser beam and the stoppage of the output by a first frequency consisting of a plurality of times in said image forming elements corresponding to an area where the speed for scanning said laser beam is low and to control said laser beam generation portion to perform the output of said laser beam and the stoppage of the output by a second frequency smaller than said first frequency in said image forming elements corresponding to an area where the speed for scanning said laser beam is high.

9. The display device according to claim 8, wherein
said projection portion is formed to project the image formed by said plurality of image forming elements in the horizontal direction,
the display device is so formed that the speed of said projecting portion for scanning said laser beam is minimized in the vicinity of both end portions in the horizontal direction of the image formed by said plurality of image forming elements and maximized in the vicinity of a central portion in the horizontal direction of the image formed by said plurality of image forming elements, and
said control portion is formed to control said laser beam generation portion to repeat the output of said laser beam and the stoppage of the output by a first frequency consisting of a plurality of times in said image forming elements in the vicinity of said both end portions where the speed for scanning said laser beam is at a minimum and to control said laser beam generation portion to perform the output of said laser beam and the stoppage of the output by a second frequency smaller than said first frequency in said image forming elements in the vicinity of said central portion where the speed for scanning said laser beam is at a maximum.

10. The display device according to claim 1, wherein
said control portion is formed to control said laser beam generation portion to change an area for stopping the output of said laser beam in an area including a boundary portion between adjacent said image forming elements.

11. The display device according to claim 10, wherein
said control portion is formed to control said laser beam generation portion not to output said laser beam so that the vicinity of a rear end portion, the vicinity of a central portion or the vicinity of a front end portion of a stop period for the output of said laser beam and the vicinity of a boundary portion between adjacent said image forming elements coincide with each other, and
said control portion is formed to control said laser beam generation portion to stop the output of said laser beam by alternately changing such control that the vicinity of the boundary portion between adjacent said image forming elements and the vicinity of the rear end portion of the stop period for the output of said laser beam coincide with each other, such control that the vicinity of the boundary portion between adjacent said image forming elements and the vicinity of the central portion of the stop period for the output of said laser beam coincide with each other and such control that the vicinity of the boundary portion between adjacent said image forming elements and the vicinity of the front end portion of the stop period for the output of said laser beam coincide with each other.

12. The display device according to claim 10, wherein
said control portion is formed to perform control of changing a position for stopping the output of said laser beam in a period of not more than one frame period.

13. The display device according to claim 12, wherein
said control portion is formed to perform control of changing the position for stopping the output of said laser beam every frame.

14. The display device according to claim 12, wherein
said control portion is formed to perform control of changing the position for stopping the output of said laser beam so that a spot position of said laser beam in said image forming elements changes.

15. The display device according to claim 1, further comprising a display device body (1) storing said laser beam generation portion, said projection portion and said control portion, wherein
said display device body consists of a portable display device body carried by a user.

16. A portable apparatus (100) having a projector function, comprising a display device (100) including a laser beam generation portion (12, 13, 14) supplied with current thereby outputting a laser beam, a projection portion (17) projecting an image formed by a plurality of image forming elements (1, 2) on an arbitrary projection area (2) by scanning said laser beam and a control portion (15) continuously supplying current to said laser beam generation portion nonstop for a period longer than a first period when such relaxation oscillation occurs that the output of said laser beam becomes unstable at the initial lasing stage thereby controlling said laser beam generation portion to output said laser beam and controlling the supply of the current to said laser beam generation portion to stop the output of said laser beam at least once in a second period scanning one image forming element.

17. The portable apparatus having a projector function according to claim 16, wherein said control portion is formed to control said laser beam generation portion to stop the output of said laser beam when scanning an area including a boundary portion between adjacent said image forming elements.

18. The portable apparatus having a projector function according to claim 17, wherein said control portion is formed to control said laser beam generation portion to repeat the output of said laser beam and stoppage of the output and to control said laser beam generation portion not to output said laser beam in a range including the boundary portion between said adjacent image forming elements by adjusting said second period scanning said image forming elements so that a stop period for the output of said laser beam and a terminal portion of said second period scanning one said image forming element overlap with each other.

19. The portable apparatus having a projector function according to claim 16, wherein said projecting portion is formed to project the image formed by said plurality of image forming elements while changing the speed for scanning said laser beam, and said control portion is formed to control said laser beam generation portion to repeat the output of said laser beam and the stoppage of the output by a first frequency consisting of a plurality of times in said image forming elements corresponding to an area where the speed for scanning said laser beam is low and to control said laser beam generation portion to perform the output of said laser beam and the stoppage of the output by a second frequency smaller than said first frequency in said image forming elements corresponding to an area where the speed for scanning said laser beam is high.

20. The portable apparatus having a projector function according to claim 16, wherein said control portion is formed to control said laser beam generation portion to change an area for stopping the output of said laser beam in an area including a boundary portion between adjacent said image forming elements.

\* \* \* \* \*